US005768097A

United States Patent [19]
Jelinger

[11] Patent Number: 5,768,097
[45] Date of Patent: Jun. 16, 1998

[54] RECONFIGURABLE MODULAR COMPUTER ASSEMBLY HAVING A MAIN CHASSIS WITH A REMOVABLY ATTACHED FACE PLATE AND AT LEAST ONE SPACER REMOVABLY ATTACHED TO THE FACE PLATE

[75] Inventor: Conrad A. H. Jelinger, Toledo, Ohio

[73] Assignee: Server Systems Technology, Inc., Toledo, Ohio

[21] Appl. No.: 639,187

[22] Filed: Apr. 26, 1996

[51] Int. Cl.$^6$ .............................. G06F 1/16; H05K 5/02; A47B 81/00
[52] U.S. Cl. ........................................ 361/683; 312/223.2
[58] Field of Search ...................... 364/708.1; 312/223.2, 312/223.1, 223.6, 334.7, 205, 348.4, 265.5, 265.6, 263; 361/683, 685, 687, 725, 727, 826–829

[56] References Cited

U.S. PATENT DOCUMENTS

| | | |
|---|---|---|
| 1,527,896 | 2/1925 | Miller . |
| 2,789,024 | 4/1957 | Heisler . |
| 2,880,379 | 3/1959 | Stoddart et al. . |
| 3,001,102 | 9/1961 | Stiefel et al. . |
| 3,691,432 | 9/1972 | Edfors et al. . |
| 4,179,724 | 12/1979 | Bonhomme . |
| 4,229,921 | 10/1980 | Schell . |
| 4,277,120 | 7/1981 | Drake et al. ............... 312/223.1 X |
| 4,383,286 | 5/1983 | Hicks . |
| 4,387,951 | 6/1983 | Hall et al. . |
| 4,479,198 | 10/1984 | Romano et al. . |
| 4,509,810 | 4/1985 | Erlam et al. . |
| 4,702,154 | 10/1987 | Dodson ......................... 361/687 X |
| 4,728,160 | 3/1988 | Mondor et al. . |
| 4,769,764 | 9/1988 | Levanon . |
| 4,845,589 | 7/1989 | Weidler et al. . |
| 4,899,254 | 2/1990 | Ferchau et al. . |
| 4,916,578 | 4/1990 | Mast . |
| 4,926,291 | 5/1990 | Sarraf . |
| 4,926,365 | 5/1990 | Hsieh . |
| 4,928,208 | 5/1990 | Volpe et al. . |
| 4,931,978 | 6/1990 | Drake et al. . |
| 4,937,806 | 6/1990 | Babson et al. . |
| 4,964,017 | 10/1990 | Jindrick et al. . |
| 4,971,563 | 11/1990 | Wells, III . |
| 4,972,298 | 11/1990 | Casa et al. . |
| 4,977,532 | 12/1990 | Borkowicz et al. . |
| 4,979,075 | 12/1990 | Murphy . |
| 5,006,959 | 4/1991 | Freige et al. . |
| 5,051,868 | 9/1991 | Leverault et al. . |
| 5,067,041 | 11/1991 | Cooke et al. . |
| 5,101,320 | 3/1992 | Bharagava et al. . |
| 5,121,296 | 6/1992 | Hsu . |
| 5,124,885 | 6/1992 | Liu . |
| 5,136,468 | 8/1992 | Wong et al. . |
| 5,138,525 | 8/1992 | Rodriguez . |
| 5,155,662 | 10/1992 | I-Shou . |
| 5,159,528 | 10/1992 | Murphy . |
| 5,164,886 | 11/1992 | Chang . |

(List continued on next page.)

*Primary Examiner*—Michael W. Phillips
*Attorney, Agent, or Firm*—MacMillan, Sobanski & Todd, LLC

[57] ABSTRACT

A reconfigurable modular computer assembly. The computer assembly comprises a housing having parallel longitudinal guide walls and a main chassis for carrying electronic components. The main chassis is slidably mounted to the housing using bayonet sliders. The main chassis includes a control panel and a cable opening for allowing cables from a transom to pass through to components located in the main chassis. A computer power supply is removably attached to the main chassis. In a preferred embodiment, a 3.5" drive cage sub-chassis and a 5.25" drive cage sub-chassis are removably attached to the main chassis. Alternatively, two 3.5" drive cage sub-chassis can be removably attached to the main chassis. When the main chassis is in a deployed position, the drive cage sub-chassis and power supply can be easily disconnected and removed from the computer assembly for cleaning, replacement or repair without powering down the computer assembly. A face plate is removably attached to the main chassis. At least one spacer is removably attached to the faceplate.

20 Claims, 8 Drawing Sheets

OTHER PUBLICATIONS

| | | |
|---|---|---|
| 5,172,305 | 12/1992 | DeWilde . |
| 5,224,019 | 6/1993 | Wong et al. . |
| 5,224,024 | 6/1993 | Tu et al. . |
| 5,227,957 | 7/1993 | Deters . |
| 5,235,493 | 8/1993 | Yu . |
| 5,269,598 | 12/1993 | Liu . |
| 5,306,079 | 4/1994 | Liu . |
| 5,313,596 | 5/1994 | Swindler et al. . |
| 5,317,105 | 5/1994 | Weber . |
| 5,331,509 | 7/1994 | Kikinis . |
| 5,337,464 | 8/1994 | Steffes . |
| 5,338,214 | 8/1994 | Steffes et al. . |
| 5,381,315 | 1/1995 | Hamaguchi et al. . |
| 5,392,192 | 2/1995 | Dunn et al. ............... 361/683 |
| 5,398,157 | 3/1995 | Paul ............... 361/684 |
| 5,420,750 | 5/1995 | Freige et al. ............... 361/695 |
| 5,423,605 | 6/1995 | Liu ............... 312/265.6 |
| 5,435,737 | 7/1995 | Haga et al. . |
| 5,438,476 | 8/1995 | Steffes . |
| 5,440,450 | 8/1995 | Lau et al. . |
| 5,460,441 | 10/1995 | Hastings et al. ............... 312/298 |
| 5,486,982 | 1/1996 | Hsu . |

RECONFIGURABLE MODULAR COMPUTER ASSEMBLY HAVING A MAIN CHASSIS WITH A REMOVABLY ATTACHED FACE PLATE AND AT LEAST ONE SPACER REMOVABLY ATTACHED TO THE FACE PLATE

BACKGROUND OF THE INVENTION

1. Field of the Invention

The invention relates generally to a reconfigurable rack-mounted computer assembly, and in particular, to a reconfigurable rack-mounted computer system having a main chassis slidably mounted in a computer housing with modular computer electronic components that can be easily installed or removed without powering down the computer assembly.

2. Related Art

New software requirements have made many computer hardware systems obsolete forcing users to buy entirely new computers or to upgrade their current computer system. Four basic computer electronic components determine performance. These components are the microprocessor, the motherboard, the RAM and the hard disk space. Changing the motherboard and the microprocessor essentially creates a new machine while adding RAM or hard disk space provides quick upgrade options.

One drawback in upgrading computer electronic components is the amount of labor required to assemble and disassemble the computer system. The compact arrangement of parts in the computer system further increases the effort required to service and maintain the parts within the computer, not only because of the small amount of space within which to work, but also because of the usually disordered arrangement of parts that is necessary to achieve a compact configuration.

The geometry of conventional desktop computer systems are such that their components are permanently affixed or buried in beneath other components or hardware fixtures making it difficult in replacing parts and/or doing maintenance and preventing the installation of new hardware components or internal devices.

There are all sorts of screws, nuts, clips, and solder connections holding different computer cases together. Operating on a computer that needs repair requires an assortment of screwdrivers, wrenches, soldering irons and other hand tools to properly take the machine out of its case. Using the wrong tool can make maintenance of a personal computer very inefficient and troublesome, especially when such connections are located deep within the computer casing.

Another problem typically associated with conventional desktop computers is that they do not possess future expandability in structural arrangement of the major electronic components.

SUMMARY OF THE INVENTION

To solve the foregoing problems, it is an object of the invention to provide a rack-mounted reconfigurable modular computer assembly that facilitates assembly and disassembly of the computer components and to provide expandability in the structural arrangement of the major electronic components.

The reconfigurable modular computer assembly comprises a housing having parallel longitudinal guide walls, a main chassis for carrying electronic components, bayonet sliders secured to the guide walls for slidably mounting the main chassis to the housing and at least one drive cage sub-chassis removably attached to the main chassis.

The drive cage sub-chassis is removably attached to the main chassis by using insertion tabs that are inserted into receiving slots located at the open front end of the main chassis and moving the drive cage sub-chassis such that an extended portion on each insertion tab is positioned under each receiving slot.

The computer assembly further includes a computer power supply for providing power to the computer components. The computer power supply includes fans that are positioned at an angle for optimum cooling of the power supply, as well as, the other computer electronic components located within the main chassis.

The housing includes an open front end and an open rear end. The main chassis is in a deployed position when the main chassis extends from an open front end of the housing and is in a retracted position when the main chassis does not extend from the open front end of the housing.

A spacer is provided to cover the space between each drive cage sub-chassis. A faceplate is removably attached to the main chassis using snaps and snap-receiving tabs located on the open front end of the main chassis. Likewise, drive covers are removably attached to the faceplate to cover space vacated by a floppy disk drive not being mounted in the drive cage sub-chassis.

A transom is mounted at the open rear end of the main chassis. The transom carries cables when the main chassis is moved from the retracted position to the deployed position and causes cables to extend through the open rear end of the housing when the main chassis is moved from the deployed position to the retracted position.

In a preferred embodiment of the invention, a 3.5" floppy disk drive is mounted in one drive cage sub-chassis and 5.25" floppy disk drive is mounted in another drive cage sub-chassis.

In another preferred embodiment of the invention, 3.5" floppy disk drives are mounted in both drive cage sub-chassis. In this embodiment, a second spacer is provided to cover the space created by the narrower drive cage sub-chassis containing the corresponding floppy disk drive.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
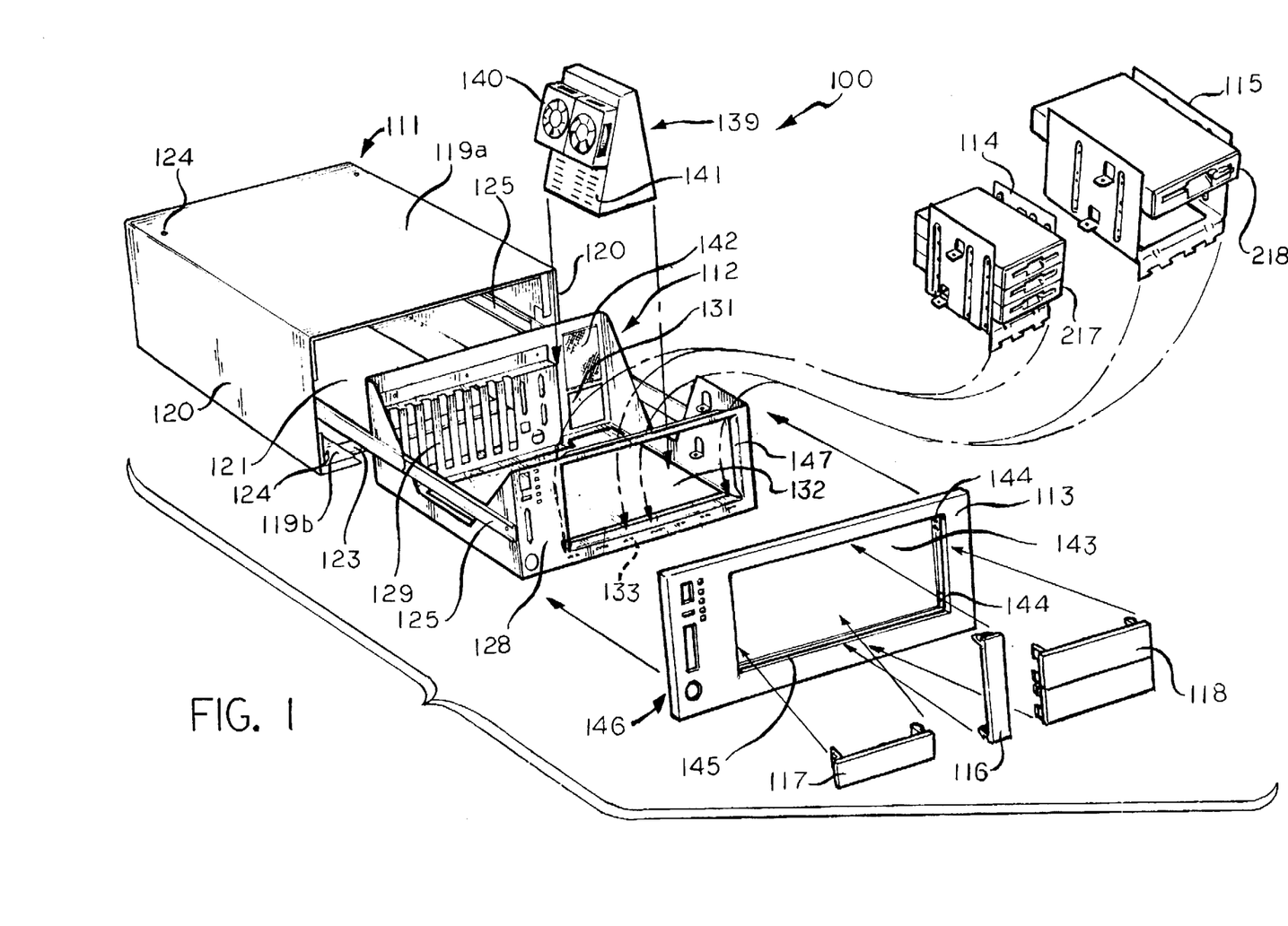
FIG. 1 shows an exploded perspective of the preferred embodiment of the invention when the main chassis is in a deployed position.

FIG. 1 shows an exploded perspective view of the reconfigurable modular computer assembly 100 according to a preferred embodiment of the invention. In the preferred embodiment, the computer assembly 100 comprises a housing 111 for enclosing a main chassis 112 for carrying electronic components, a faceplate 113 removably attached to the housing 111, a 3.5" drive cage sub-chassis 114 and a 5.25" drive cage sub-chassis 115 removably attached to the main chassis 112, a first spacer 116 removably attached to the faceplate 113 and drive covers 117, 118 removably attached to the faceplate 113.

Figure 2:
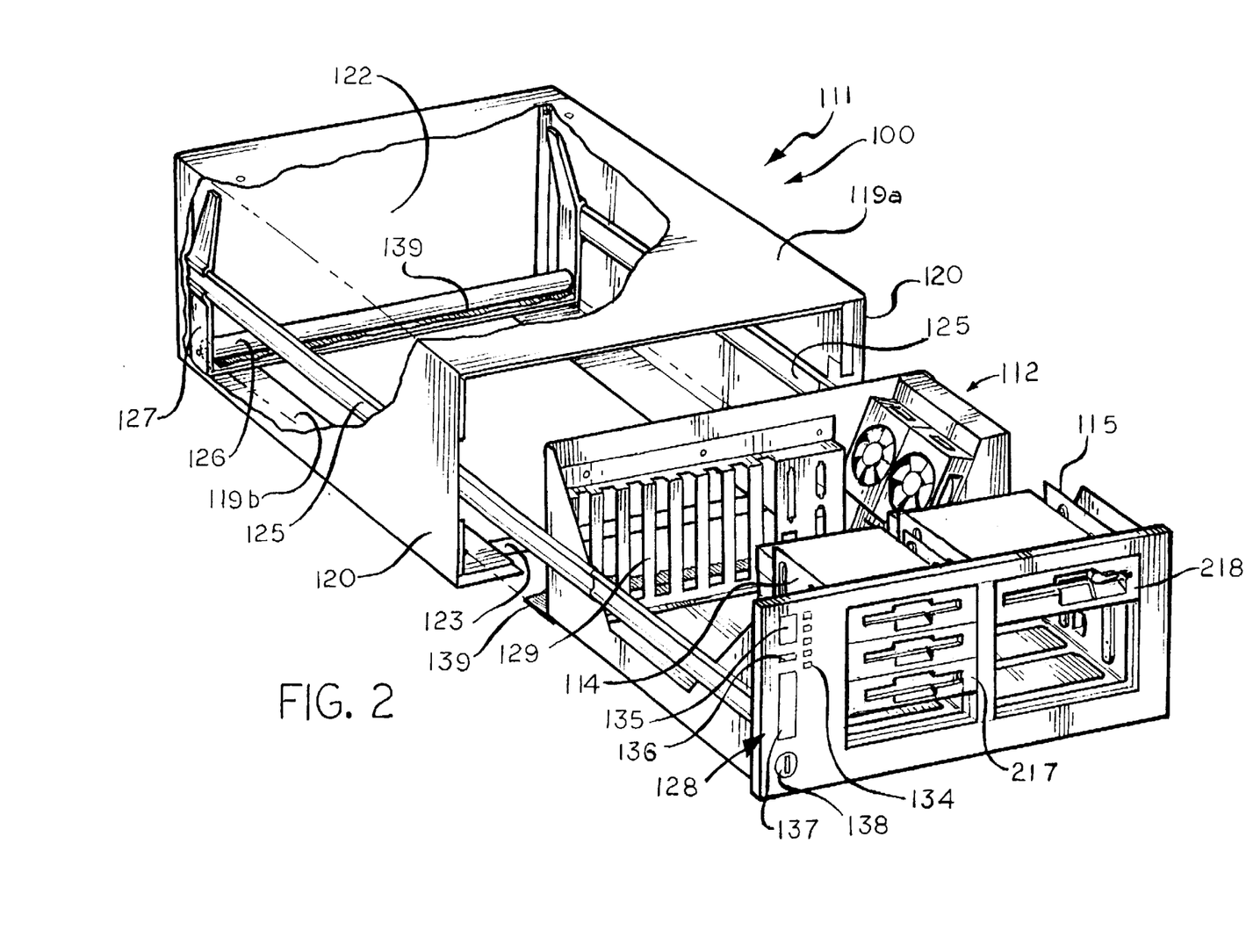
FIG. 2 shows a partial cut away view of the preferred embodiment of the invention when the main chassis is in a deployed position and when the drive cage sub-chassis and power supply are installed.

The housing 111 comprises a top shell 119a, a bottom shell 119b, side shells 120 forming parallel longitudinal guide walls, an open front end 121 and an open rear end 122 (FIG. 2). Preferably, the housing 111 is made of 18 gauge galvanized steel. Alternatively, the housing 111 can be made of an 18 gauge steel powder coated shell. Bulkheads 123 can be mounted to the top shell 119a, bottom shell 119b and side shells 120 for reinforcing and providing additional structural support for the housing 111.

In the preferred embodiment, for example, the top shell 119a can support 200 PSI of pressure when the pressure is applied to the corners and 50 PSI of pressure when the pressure is applied to the center of the top shell 119a. Docking holes 124 and docking pins (not shown) can be used for attaching the bulkheads 123 to the housing 111. Feet (not shown) can also be mounted to the housing 111 by using the docking holes 124 located on the bottom shell 119b.

It is envisioned that a courtcounting thread bearing (not shown) on the foot can then be used to insert docking pins that connect to a top shell of another computer assembly to allow stacking of a plurality of computer assemblies. In addition, it is envisioned that the computer assembly 100 can be bolted to a work surface using a C clamp (not shown) or by drilling through the work surface and securing the computer assembly 100 to the work surface. It is also envisioned that the computer assembly can be removed from the housing 111 and inserted into a drawer of a desk using the bayonet sliders 125. Thus, the computer assembly can be used in four positions: (1) desk top, (2) rack mounted, (3) stack mounted and (4) drawer mounted.

FIG. 2 shows a partial cut away view of the preferred embodiment of the invention when the main chassis 112 is in the deployed position with the drive cage sub-chassis 114 for the 3.5" floppy disk drive 217, the drive cage sub-chasis 115 for the 5.25" floppy disk drive 218 and computer power supply 139 are installed in the computer assembly 100.

Referring now to FIG. 2, the main chassis 112 is slidably mounted to the housing 111 using bayonet sliders 125 as a guide means for guiding the main chassis 112. The bayonet sliders 125 are mounted on the side shells 120 of the housing 111 and mate with bayonet sliders mounted to the main chassis 112 as described below. In the preferred embodiment, the bayonet sliders 125 are preferably made of a 16" non-bearing neoprene bearing surface material.

When the main chassis 112 extends from the open front end 121 of the housing 111, the main chassis 112 is in a deployed position. When the main chassis 112 does not extend from the open front end 121 of the housing 111, the main chassis 112 is in a retracted position. The main chassis 112 can also be removed in its entirety from the housing 111 by moving the main chassis 112 to the deployed position and then lifting the main chassis 112 upwardly to decouple the bayonet sliders 125. After removal, the main chassis 112 can be secured to a standard 19" rack mount without changing hardware or using additional peripheral equipment.

A transom 126 can also be mounted to the housing 111. The transom 126 carries the cables (not shown) fed through the power supply opening 131 when the main chassis 112 moves from a retracted position to a deployed position. The transom 126 includes an articulated curtain 139 that deploys when the main chassis 112 to support the various cables when moving from a retracted position to a deployed position. The transom 126 also causes the cables to exit through the open rear end 122 of the housing 111 when the main chassis 112 moves from the deployed position to the retracted position. As the main chassis 112 moves to the retracted position, the articulated curtain 139 also retracts into the transom 126 like a conventional window shade assembly. The transom 126 is mounted to the open rear end 122 of the housing 111 using plastic clamps 127 attached to the bayonet sliders 125 mounted to the housing 111.

Figure 3:
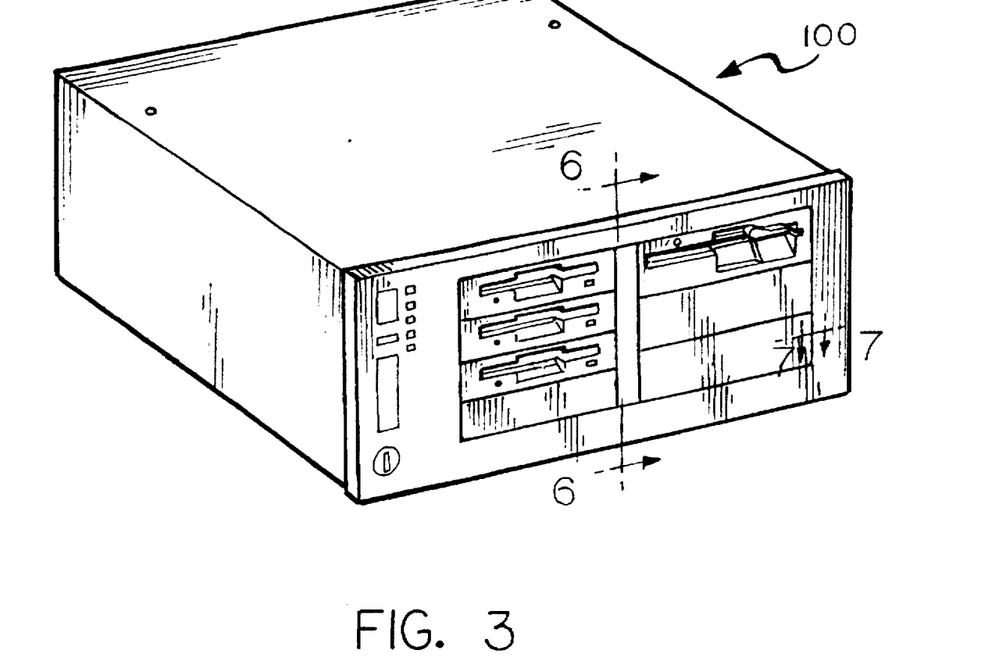
FIG. 3 shows a reconfigurable modular computer assembly according to a preferred embodiment of the invention of FIG. 1 when the main chassis is in a retracted position.

FIG. 3 shows the preferred embodiment of the reconfigurable modular computer assembly 100 when the main chassis 112 is in the retracted position. In the preferred embodiment illustrated in FIG. 3, the computer assembly 100 includes a 3.5" drive cage sub-chassis 114 and a 5.25" drive cage sub-chassis 115. Each drive cage sub-chassis 114, 115 has the capability to hold a plurality of floppy disk drives.

Referring now to FIG. 2, the main chassis 112 also includes a control panel 128, a backplane bezel 129, a filter opening located at the rear end of the main chassis 112 for receiving a power supply filter 142 (FIG. 1) that prevents particulates from entering the power supply, a cable opening 131 for allowing cables from the transom 126 to pass through to components located in the main chassis 112. A faceplate opening 132 and tab-receiving slots 133 are located on the front edge of the main chassis 112 for allowing insertion of connection tabs located on the drive cage sub-chassis 114, 115 as described below.

Specifically, the control panel 128 includes a light emitting diode (LED) array 134 for allowing visual indication of the high speed functions and cooling status of the motherboard and other various internal components of the computer. For example, the LED array may include a "power on" light, a "Turbo" light, a "hard drive" light, a "cooling fan on/off" light and a "overheat" light. The "power on" light may be used to indicate that the computer is powered on. The "Turbo" light may be used to indicate that the computer is operating at a CPU clock speed higher than normal. The "hard drive" light may be used to indicate that the hard drive is being accessed by the computer. The "cooling fan on/off" light may be used, for example, to indicate whether the cooling fan is on when the light is green or off when the light is red. The "overheat" light may be used to indicate, for example, that the cooling fan has possibly malfunctioned causing the temperature inside the housing 111 to exceed a predetermined value.

In addition, the control panel 128 also includes a computer on/off switch 135 for turning the computer on and off. The computer on/off switch may be, for example, an ordinary paddle switch. A reset switch 136 is rebated into the control panel to prevent accidental resetting of the equipment while allowing the user to easily reset the machine. The control panel 128 further includes a docking port 137 for connecting a laptop computer, typically a 25 pin DB connector, and externally connected components, such as CD-ROM drives. Finally, the control panel 128 includes a case lock 138 for locking and unlocking the computer and peripherals, such as a keyboard and monitor (not shown). The case lock 138 is typically a Cutler Hammer lock mechanism with three positions: lock on keyboard off; lock on keyboard on; lock off keyboard on. The case lock allows a person to work on the electronic components when the main chassis 112 is in the deployed position and the keyboard in the lock on position. It should be understood that the invention is not limited by the type of indications on the control panel and that other visual indications can be included on the control panel.

In the preferred embodiment, a backplane bezel 129 is mounted on the rear end of the main chassis 112. The backplane bezel 129 can be chosen for several different backplanes according to whether the computer assembly 100 is for a RISC-based computer, an APPLE-based computer or an INTEL-based (IBM) computer. Typically, the backplane bezel 129 will contain 12 slots for a RISC-based computer, 8 slots for an APPLE-based computer and 8 or 12 slots for an INTEL-based (IBM) computer.

The computer assembly 100 includes a computer power supply 139 for providing power to the computer components. In the preferred embodiment, the computer power supply 139 supplies approximately 300 watts of power to the computer electronic components. The computer power supply 139 includes fans 140 to prevent the temperature of the computer power supply 139 from increasing above a predetermined limit. The "overheat" light provides a visual indication that the temperature inside the main chassis 112 has exceeded above the predetermined limit. The fans 140 are positioned at an angle for optimum cooling of the computer power supply 139, as well as, the other computer components located within the main chassis 112.

The computer power supply 139 also includes plug receptacles 141 for allowing other computer components to be plugged into the computer power supply 139. The filter 142 mounted in the rear end of the main chassis 112 prevents particulates from entering the computer power supply 139. The electrical power for the computer power supply 139 and other computer electronic components, if necessary, is provided by cables fed through the power supply opening 131 in the rear end of the main chassis 112. In the preferred embodiment, cabling is provided from the electrical power to the computer power supply 139, not vice versa, as with other conventional computer systems. This feature allows the computer power supply 139 to be simply plugged into the main chassis 112 without the need for cabling to be routed from the computer power supply 139 to the electrical power. In this manner, the computer power supply 139 can be easily installed, disconnected or removed from the computer assembly 100. Similarly, computer electronic components that are plugged into the plug receptacles 141 can also be easily installed, disconnected or removed from the computer assembly 100.

Figure 4:
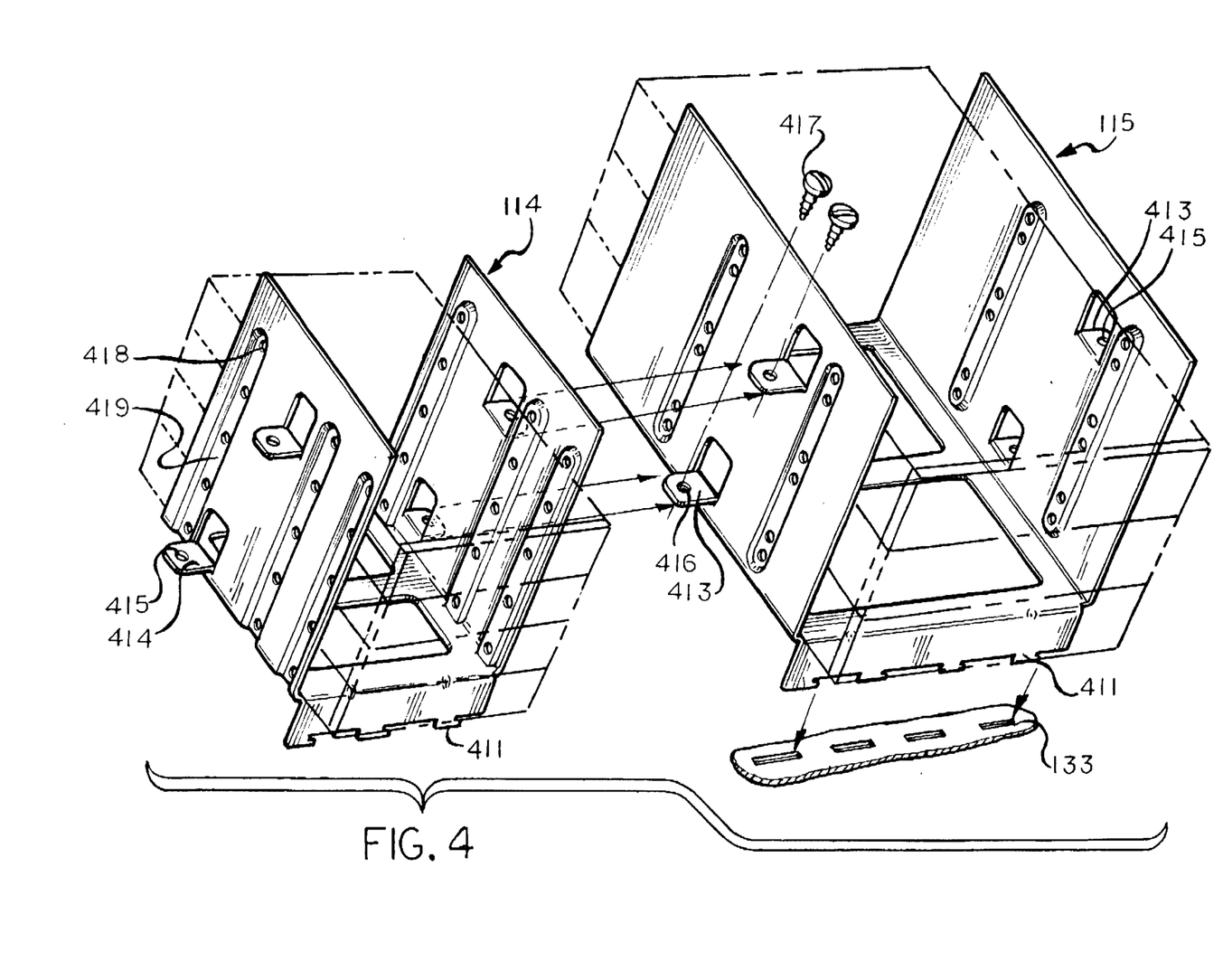
FIG. 4 shows a perspective view of a 3.5" drive cage sub-chassis and a 5.25" drive cage sub-chassis according to the preferred embodiment of the invention of FIG. 1.

FIG. 4 shows a perspective view of a 3.5" drive cage sub-chassis 114 and a 5.25" drive cage sub-chassis 115. Preferably, each drive cage sub-chassis 114, 115 is made of 18 gauge galvanized steel. Alternatively, each drive cage sub-chassis 114, 115 can be made of an 18 gauge steel powder coated shell.

In the preferred embodiment, after mounting the appropriate floppy drives 217, 218 to the drive cage sub-chassis 114, 115, each drive cage sub-chassis 114, 115 is removably attached to the main chassis 112 of the computer assembly 100. This is accomplished by inserting insertion tabs 411 into the tab-receiving slots 133 located on the front edge of the main chassis 112.

Figure 5:
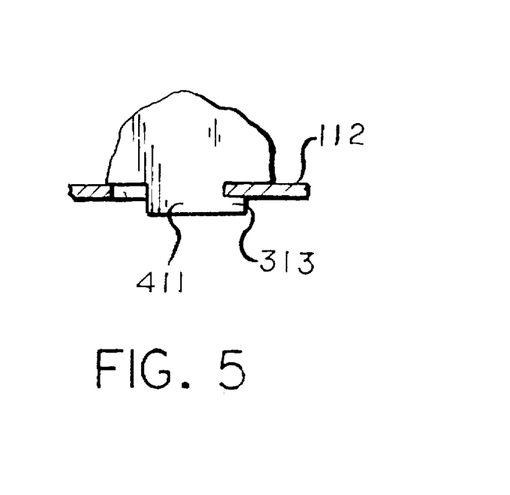
FIG. 5 shows a cut away side view when a drive cage sub-chassis is inserted into the main chassis.

As best seen in FIG. 5, after the insertion tabs 411 are inserted into the tab-receiving slots 133, the drive cage sub-chassis 114, 115 is moved such that an extended portion 313 on each insertion tab 411 is positioned under the main chassis 112. Each drive cage sub-chassis 114, 115 can be easily removed from the main chassis 112 by reversing the above operation. In this manner, each drive cage sub-chassis 114, 115 can be easily installed, disconnected or removed from the main chassis 112 of the computer assembly 100.

Referring now to FIG. 4, each drive cage sub-chassis 114, 115 includes connection tabs 413, 414 that extend from the sides of each drive cage sub-chassis 114, 115. Each connecting tab 413, 414 includes a connecting hole 415, 416, respectively, for receiving connecting screws 417. In the preferred embodiment, once the 5.25" drive cage sub-chassis 115 is removably attached to the main chassis 112, the connecting hole 415 of each connecting tab 413 on the 5.25" drive cage sub-chassis 115 on the side nearest the main chassis 112 are substantially aligned so that a connecting screw 417 can be inserted into each connecting hole 415 to securely attach the 5.25" drive cage sub-chassis 115 to the main chassis 112. Similarly, once the 3.5" drive cage sub-chassis 114 is attached to the main chassis 112, each connecting hole 416 of each connecting tab 414 on the 3.5" drive cage sub-chassis 114 and each connecting hole 415 of each connecting tab 413 on the 5.25" drive cage sub-chassis 115 nearest the 3.5" drive cage sub-chassis 114 are substantially aligned so that a connecting screw 417 can be inserted into the connecting holes 415, 416 to securely attach the 3.5" drive cage sub-chassis 114 to the 5.25" drive cage sub-chassis 115. In this manner, each drive cage sub-chassis 114, 115 are securely attached to the main chassis 112 and also securely attached to each other.

As seen in FIG. 4, each drive cage sub-chassis 114, 115 includes a plurality of mounting holes 418 for receiving floppy drive mounting screws (not shown). Preferably, the appropriate floppy drives are mounted in the appropriate drive cage sub-chassis 114, 115 by inserting the mounting screws into the mounting holes 418 before attaching each drive cage sub-chassis 114, 115 to the main chassis 112. The mounting holes 418 are located in recessed areas 419 of sufficient depth such that the height of the mounting screws is less than the depth of the recessed areas 419 when the mounting screws are fully inserted into the 3.5" and 5.25" floppy drives 217, 218. In this manner, the mounting screws do not protrude when inserted into the drive cage sub-chassis 114, 115.

Referring now to FIG. 1, the faceplate 113 includes a main opening 143 having a pair of snaps 144 located on opposing sides of the faceplate 113. The main opening 143 has a sufficient width and height so as to be able to accommodate disk drives of various sizes. For instance, the main opening 143 may have a sufficient width to allow at least three 3½ inch disk drives, at least two 5¼ inch disk drives or any combination thereof to be mounted in the longitudional direction and may have a sufficient height to allow at least four 3½ inch or three 5¼ inch floppy disk drives to be mounted in the vertical direction. The faceplate 113 also includes snap-receiving tabs 145 on the top, bottom and side edges of the faceplate 113. Further, the faceplate 113 includes openings 146 for the control panel LED array, the docking port, the case lock, the computer on/off switch and the reset switch of the main chassis 112. It should be understood by those skilled in the art that the invention is not limited by the location of the control panel LED array, the docking port, the case lock, the computer on/off switch and the reset switch and that the invention can be practiced by locating these components at other locations on the faceplate 113.

Figure 6:
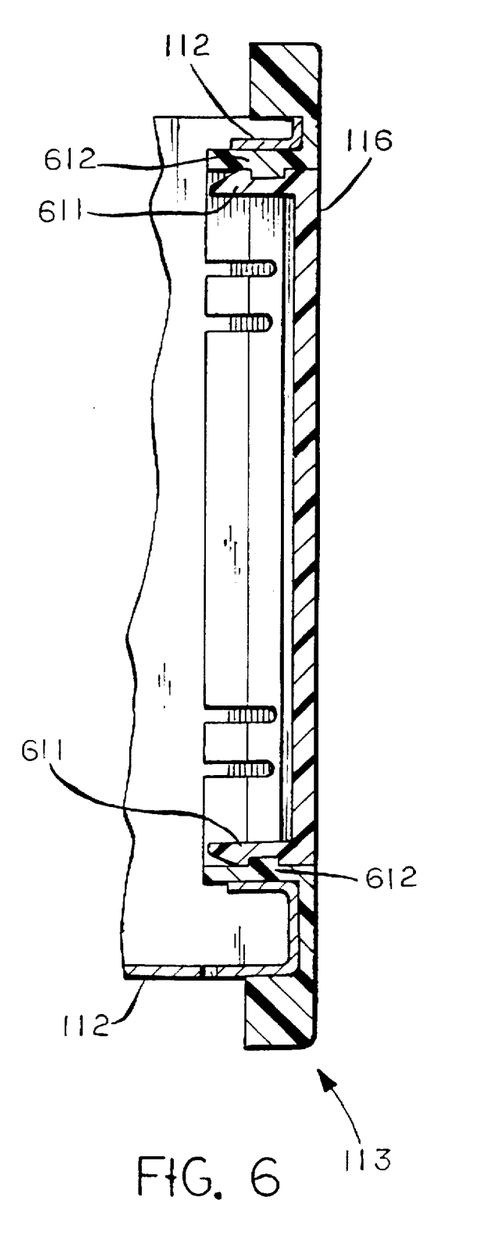
FIG. 6 shows a cross-sectional view along lines 6—6 of FIG. 3.

Referring now to FIG. 6, after the floppy drives 217, 218 and the drive cage sub-chassis 114, 115 are installed in the main chassis 112, the faceplate 113 can be attached to the main chassis 112. This is accomplished by the snaps 144 on the faceplate 113 engaging snap-receiving tabs 147 located at the front end of the main chassis 112 (FIG. 1). In this manner, the faceplate 113 can be easily installed and removed from the front end of the main chassis 112 of the computer assembly 100.

As seen in FIG. 6, the first spacer 116 can be snapped into place in a similar fashion as the faceplate 113 by using snaps 611 that engage snap-receiving tabs 612 located at the top and bottom edges of the faceplate 113. The first spacer 116 has a width approximately equal to a distance between the 3.5" drive cage sub-chassis 114 and the 5.25" drive cage sub-chassis 115. In particular, the first spacer 116 has a width approximately equal to the distance that the connecting tabs 413, 414 extend from the side of each drive cage sub-chassis 114, 115. Thus, the first spacer 116 substantially covers the space between the floppy drives of each drive cage sub-chassis 114, 115 on the faceplate 113 and can be easily installed and removed from the faceplate 113 by using the snaps 611 and the snap-receiving tabs 612.

Figure 7:
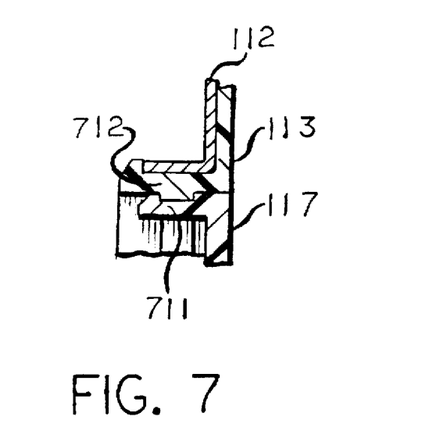
FIG. 7 shows a cross-sectional view along lines 7—7 of FIG. 3.

As seen in FIG. 7, drive covers 117, 118 can also be snapped into place in a similar fashion as the first spacer 116 and the faceplate 113 by using snaps 711 that engage snap-receiving tabs 712 on the faceplate 113 and first spacer 116. The drive cover 117 has a width approximately equal to the width of the drive cage sub-chassis 114 for the 3.5" floppy disk drive 217 and the drive cover 118 has a width approximately equal to the width of the drive cage sub-chassis 115 for the 5.25" floppy disk drive 218. However, one skilled in the art should appreciate that the width of the drive cage sub-chassis does not limit the invention and that the invention can be practiced with various widths drive cage sub-chassis. Further, the disk drives 217, 218 may be internally mounted in the main chassis 112 and the drive covers 117, 118 can completely cover the space vacated by the disk drives in order to provide increased security for the computer assembly 100.

Figure 8:
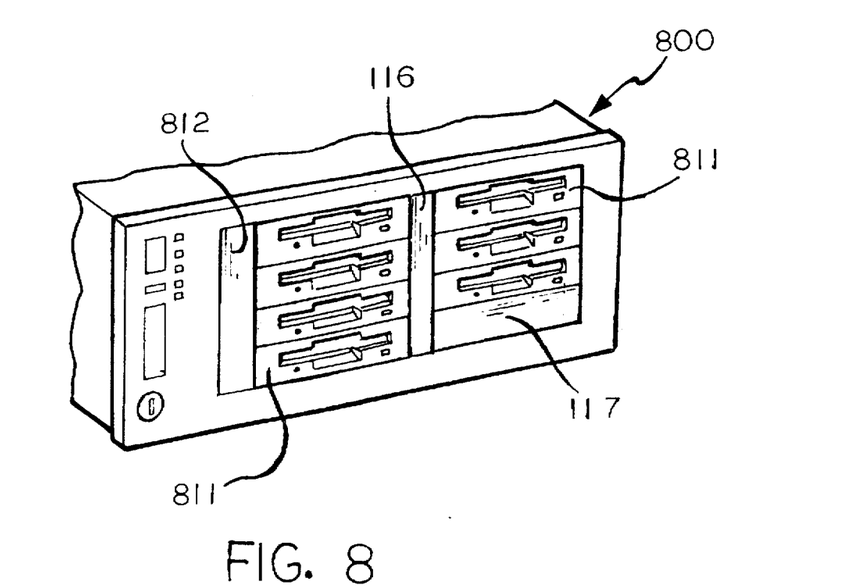
FIG. 8 shows a reconfigurable modular computer assembly according to a second preferred embodiment of the invention when the main chassis is in a retracted position.

FIG. 8 shows a reconfigurable modular computer assembly 800 according to a second preferred embodiment of the invention. As seen in FIG. 8, the computer assembly 800 includes at least one drive cage sub-chassis containing 3.5" floppy disk drives 811, instead of a drive cage sub-chassis 114, 115 containing a 3.5" floppy disk drive 217 and a 5.25" floppy disk drive 218. Because the combined space occupied by two 3.5" floppy disk drives 813 are narrower than the 3.5" and 5.25" floppy disk drives 217, 218 in the first preferred embodiment of the invention, the computer assembly 800 also includes a second spacer 812 to cover the empty space caused by the narrower 3.5" floppy disk drives 811. To cover the empty space from the narrower 3.5" floppy disk drives 811, the second spacer 812 has a width approximately equal to the difference between the width of a 3.5" floppy disk drive 217 and a 5.25" floppy disk drive 218 of the first preferred embodiment, or approximately 1.75". Similar to the first spacer 116, the second spacer 812 includes snaps that engage snap-receiving tabs 612 on the top and bottom edges of the faceplate 113. Thus, the second spacer 812 can also be easily snapped into place and removed in a similar fashion as the first spacer 116 by using snaps that engage snap-receiving tabs 612 on the faceplate 113.

Figure 9:
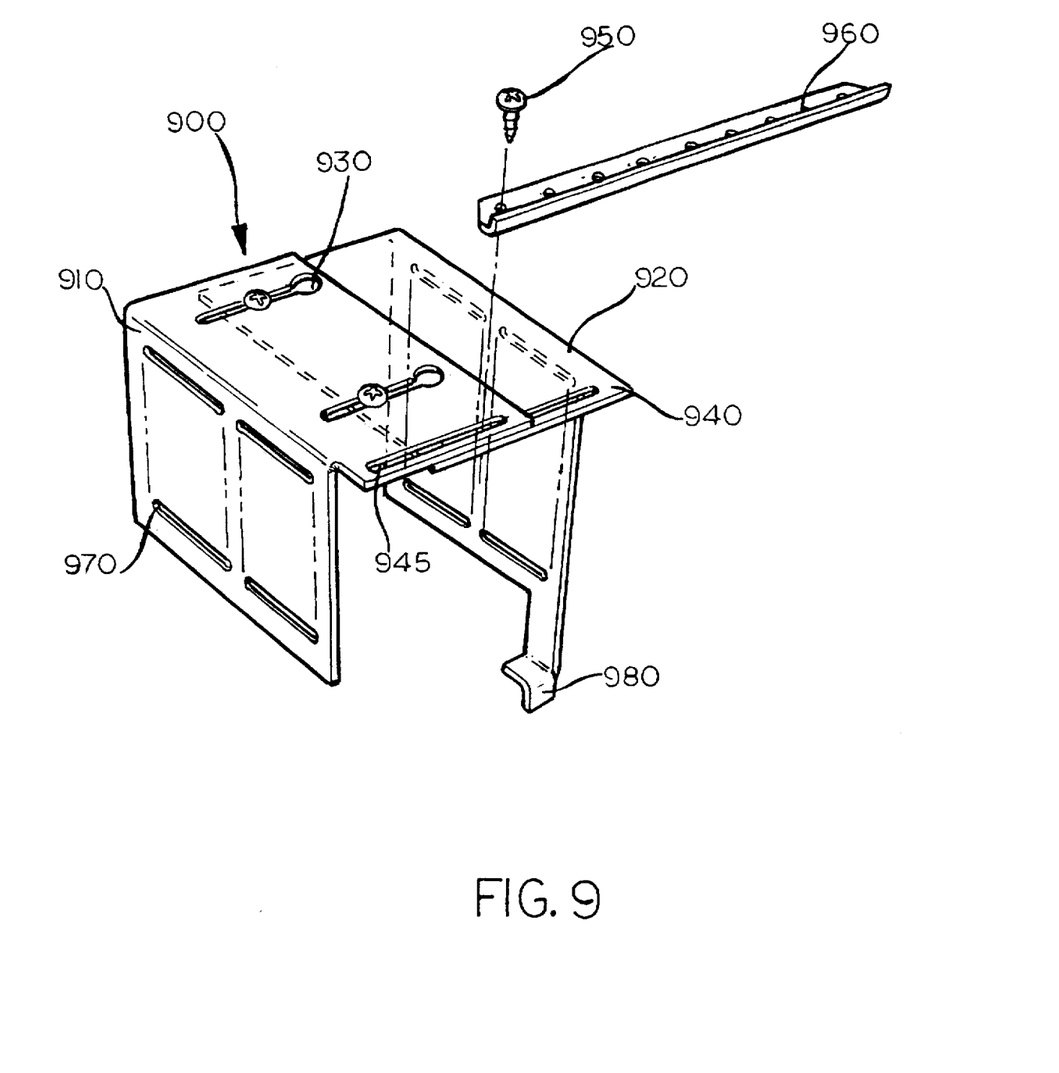
FIG. 9 shows a drive cage sub-chassis according to a second preferred embodiment of the invention.

FIG. 9 shows a drive cage sub-chassis 900 according to a second preferred embodiment of the invention. As illustrated in FIG. 9, the drive cage sub-chassis 900 comprises two sections 910, 920 that overlap each other. Each section 910, 920 also includes slots 930 for allowing a width of the drive cage sub-chassis 900 to be adjusted. Each section 910, 920 includes connection tabs 940 having connection holes 945 that extend from the front of the drive cage sub-chassis 900. In the second preferred embodiment of the invention, the drive cage sub-chassis 900 is removably attached to the main chassis 112 using mounting screws 950 that are received in mounting holes 960 in the main chassis 112. Each section 910, 920 also includes a plurality of mounting slots 970 for receiving mounting screws (not shown) for mounting the disk drives 217, 218 to each section of the drive cage sub-chassis 900. The drive cage sub-chassis 900 also includes an insertion tab 980 extending from the front of the drive cage sub-chassis 900.

Figures 10, 11:
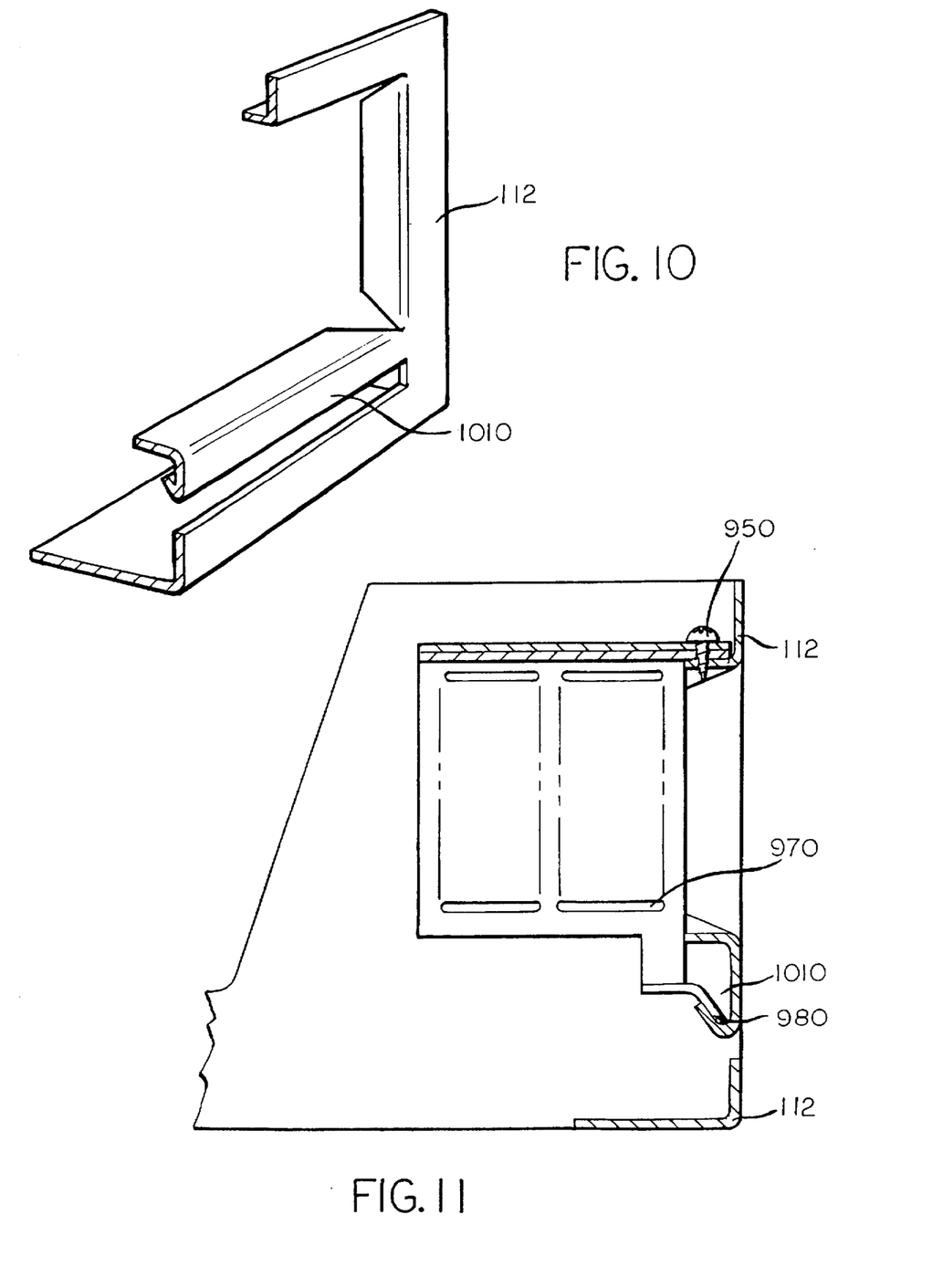
FIG. 10 shows a cross-sectional view of the main chassis according to the second preferred embodiment of the invention.
FIG. 11 shows a side view of the drive cage sub-chassis into the main chassis according to the second preferred embodiment of the invention.

As best seen in FIGS. 10 and 11, the insertion tab 980 extending from the front of the drive cage sub-chassis 900 is received in a receiving slot 1010 on the main chassis 112 for slidably supporting the drive cage sub-chassis 900. Thus, the drive cage sub-chassis in this preferred embodiment of the invention has the capability to accomodate disk drives of various widths.

Figures 12, 13:
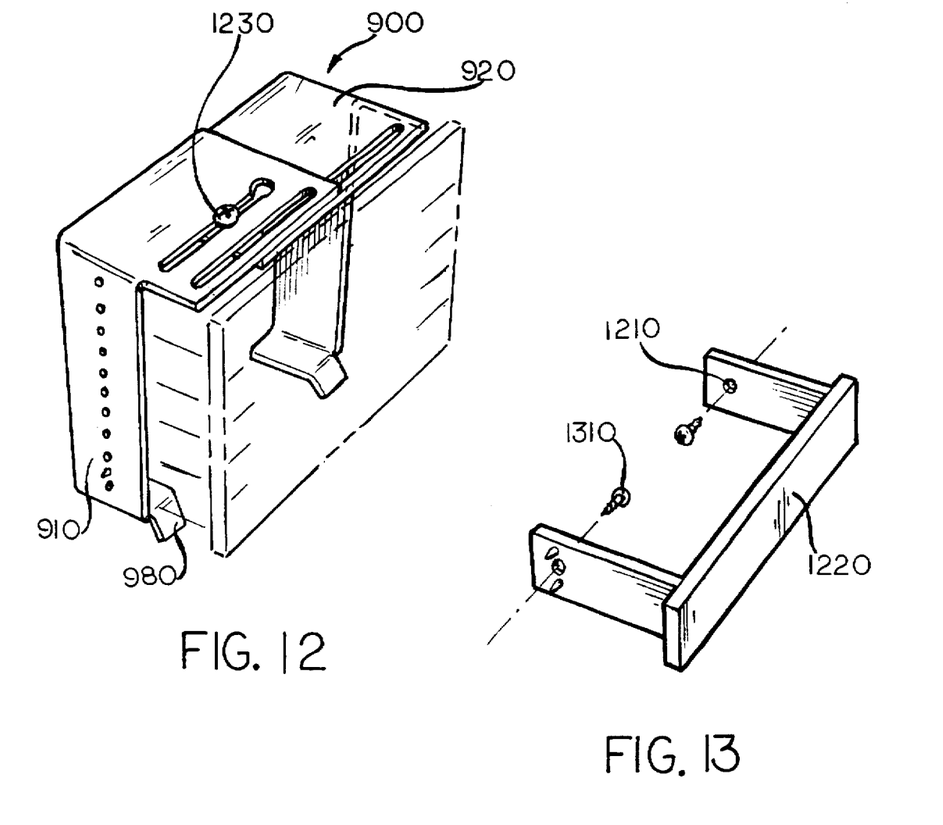
FIG. 12 shows a perspective view of the drive cage sub-chassis according to the second preferred embodiment of the invention.
FIG. 13 shows a perspective view of a drive cover according to the second preferred embodiment of the invention.
Figure 14:
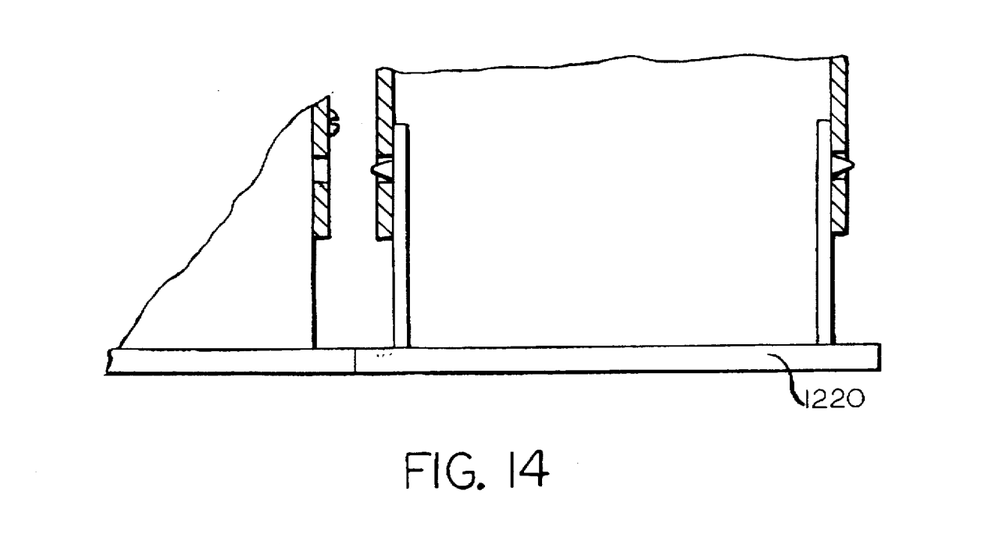
FIG. 14 shows a top view of the drive cover inserted into the drive cage sub-chassis according to the second preferred embodiment of the invention.

As seen in FIGS. 12–14, the drive cage sub-chassis in the second preferred embodiment of the invention includes holes 1210 for removably attaching a drive cover 1220 to each section of the drive cage sub-chassis using mounting screws 1310. Once the disk drives are mounted to each section 910, 920 of the drive cage sub-chassis 900, each section of the drive cage sub-chasses held in place by a screw 1230. As in the first embodiment, the drive cover 1220 is used to fill the space vacated by a disk drive not mounted in the drive cage sub-chassis 900.

It should be understood that other computer components known to those skilled in the art, such as CD-ROM or optical disk drives, can be used in a similar manner and the invention is not limited by the use of 3.5" and 5.25" floppy disk drives as described in the preferred embodiments of the invention.

It can be seen from the foregoing that a computer assembly is provided in which disk drives and power supply are mounted to the main chassis in such a way that they can be easily disconnected from the computer assembly and can be removed for cleaning, replacement or repair. In addition, when the main chassis is in a deployed position, all the parts of the housing of the computer assembly can be accessed without the need for powering down the computer assembly and without the need to dismantle any of the components, circuits or power supply.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

What is claimed is:

1. A reconfigurable modular computer assembly, comprising:
   a housing having parallel longitudinal guide walls;
   a main chassis for carrying electronic components;
   mounting means attached to said guide walls for slidably mounting said main chassis to said housing;
   at least one drive cage sub-chassis being removably attached to said main chassis;
   a faceplate removably attached to said main chassis; and
   at least one spacer removably attached to said faceplate.

2. A reconfigurable modular computer assembly according to claim 1, wherein said at least one drive cage sub-chassis further includes connection tabs that extend from each drive cage sub-chassis, each connecting tab including a connecting hole for receiving connecting screws.

3. A reconfigurable modular computer assembly according to claim 1, wherein said at least one drive cage sub-chassis includes a plurality of mounting holes for receiving floppy drive mounting screws.

4. A reconfigurable modular computer assembly according to claim 1, wherein said at least one drive cage sub-chassis is removably attached to the main chassis using a plurality of insertion tabs, said at least one drive cage sub-chassis being attached to said main chassis by inserting said insertion tabs into receiving slots located on said main chassis and moving said at least one drive cage sub-chassis such that an extended portion on each insertion tab is positioned under a corresponding receiving slot.

5. A reconfigurable modular computer assembly according to claim 1, wherein a width of said at least one drive cage sub-chassis is adjustable.

6. A reconfigurable modular computer assembly according to claim 1 further comprising at least one disk drive attached to said at least one drive cage sub-chassis.

7. A reconfigurable modular computer assembly according to claim 1, wherein said faceplate is removably attached to said main chassis by using snaps that engage snap-receiving tabs located on said main chassis.

8. A reconfigurable modular computer assembly according to claim 1 further comprising a drive cover removably attached to said faceplate.

9. A reconfigurable modular computer assembly according to claim 9, wherein said drive cover is removably attached to said faceplate by using snaps that engage snap-receiving tabs located on said faceplate.

10. A reconfigurable modular computer assembly according to claim 1, wherein said at least one spacer is removably attached to said faceplate by using snaps that engage snap-receiving tabs located on said faceplate.

11. A reconfigurable modular computer assembly according to claim 1, wherein said mounting means for slidably mounting said main chassis to said housing comprises bayonet sliders.

12. A reconfigurable modular computer assembly according to claim 11, wherein said bayonet sliders are made of a 16" non-bearing neoprene bearing surface material.

13. A reconfigurable modular computer assembly according to claim 1 further comprising a power supply removably attached to said main chassis.

14. A reconfigurable modular computer assembly according to claim 13, wherein said power supply includes fans angularly mounted on said power supply to provide cooling of the electronic components in said computer assembly.

15. A reconfigurable modular computer assembly according to claim 1, wherein said housing further comprises an open front end and an open rear end.

16. A reconfigurable modular computer assembly according to claim 15, wherein said main chassis is slidable from a retracted position not extending from said open front end of said housing to a deployed position extending from said open front end of said housing.

17. A reconfigurable modular computer assembly according to claim 16 further comprising a transom for carrying cables when the main chassis is moved from the retracted position to the deployed position and for causing cables to extend through said open rear end of said housing when the main chassis is moved from the deployed position to the retracted position.

18. A reconfigurable modular computer assembly according to claim 17, wherein said transom is mounted to said open rear end of said housing using plastic clamps attached to said mounting means.

19. A reconfigurable modular computer assembly, comprising:
   a housing having an open front end, an open rear end and parallel longitudinal side walls;
   a main chassis slidably mounted to said housing, said main chassis being movable from a retracted position to a deployed position;
   a power supply removably attached to said main chassis, said power supply including fans angularly mounted on said power supply to provide cooling of internal components in said computer assembly;
   a transom for carrying cables, said transom being mounted to said open rear end of said housing;
   at least one drive cage sub-chassis removably attached to said open front end of said main chassis by inserting a plurality of insertion tabs into receiving slots located on said main chassis and moving said at least one drive cage sub-chassis such that an extended portion on each insertion tab is positioned under a corresponding receiving slot;
   a faceplate removably attached to said main chassis; and
   at least one spacer removably attached to said faceplate.
   wherein said at least one drive cage sub-assembly and said power supply can be accessed and disconnected without the need for powering down said computer assembly when said main chassis is in the deployed position.

20. A reconfigurable modular computer assembly according to claim 19, wherein a width of said at least one drive cage sub-chassis is adjustable.

* * * * *